(12) United States Patent
Sekine

(10) Patent No.: US 10,946,512 B2
(45) Date of Patent: Mar. 16, 2021

(54) ROBOT

(71) Applicant: Seiko Epson Corporation, Tokyo (JP)

(72) Inventor: Kotaro Sekine, Azumino (JP)

(73) Assignee: Seiko Epson Corporation

(*) Notice: Subject to any disclaimer, the term of this patent is extended or adjusted under 35 U.S.C. 154(b) by 181 days.

(21) Appl. No.: 16/193,068

(22) Filed: Nov. 16, 2018

(65) Prior Publication Data

US 2019/0152050 A1    May 23, 2019

(30) Foreign Application Priority Data

Nov. 17, 2017 (JP) .............................. JP2017-221563

(51) Int. Cl.

| B25J 9/00 | (2006.01) |
|---|---|
| B25J 18/00 | (2006.01) |
| B25J 19/00 | (2006.01) |
| B25J 9/04 | (2006.01) |
| F16H 25/20 | (2006.01) |
| F16H 25/22 | (2006.01) |

(52) U.S. Cl.
CPC .............. *B25J 9/0009* (2013.01); *B25J 9/043* (2013.01); *B25J 9/044* (2013.01); *B25J 18/00* (2013.01); *B25J 19/0075* (2013.01); *F16H 25/2204* (2013.01); *F16H 2025/2096* (2013.01)

(58) Field of Classification Search
CPC ... B25J 18/00; B25J 9/043; B25J 9/042; B25J 9/041; B25J 9/044; B25J 9/126; B25J 9/0009; B25J 19/0075; B25J 19/06; H02K 11/33
See application file for complete search history.

(56) References Cited

U.S. PATENT DOCUMENTS

| 7,347,120 B2 | 3/2008 | Friedrich et al. |
|---|---|---|
| 2005/0087034 A1 | 4/2005 | Friedrich et al. |
| 2015/0100159 A1* | 4/2015 | Park ...................... H02K 11/21 700/258 |
| 2017/0341223 A1* | 11/2017 | Hahakura ............ B25J 19/0029 |
| 2018/0056506 A1* | 3/2018 | Nishimura ............... B25J 9/126 |
| 2018/0215036 A1* | 8/2018 | Sekine ................. B25J 19/0004 |

FOREIGN PATENT DOCUMENTS

| JP | 2003103490 A | * | 4/2003 | ............ B25J 9/1615 |
|---|---|---|---|---|
| JP | 2004283964 A | * | 10/2004 | |
| JP | 2005-125489 A | | 5/2005 | |
| JP | 2005237168 A | * | 9/2005 | |
| JP | 2007037238 A | * | 2/2007 | |
| JP | 2013006240 A | * | 1/2013 | |

* cited by examiner

*Primary Examiner* — Luis A Gonzalez
(74) *Attorney, Agent, or Firm* — Harness, Dickey & Pierce, P.L.C.

(57) ABSTRACT

A robot includes an arm having a cover, a first motor, a first amplifier having a first drive circuit that drives the first motor, and a plate provided in an interior of the arm, wherein the plate is provided with the first amplifier and separated from the respective first motor and cover.

1 Claim, 4 Drawing Sheets

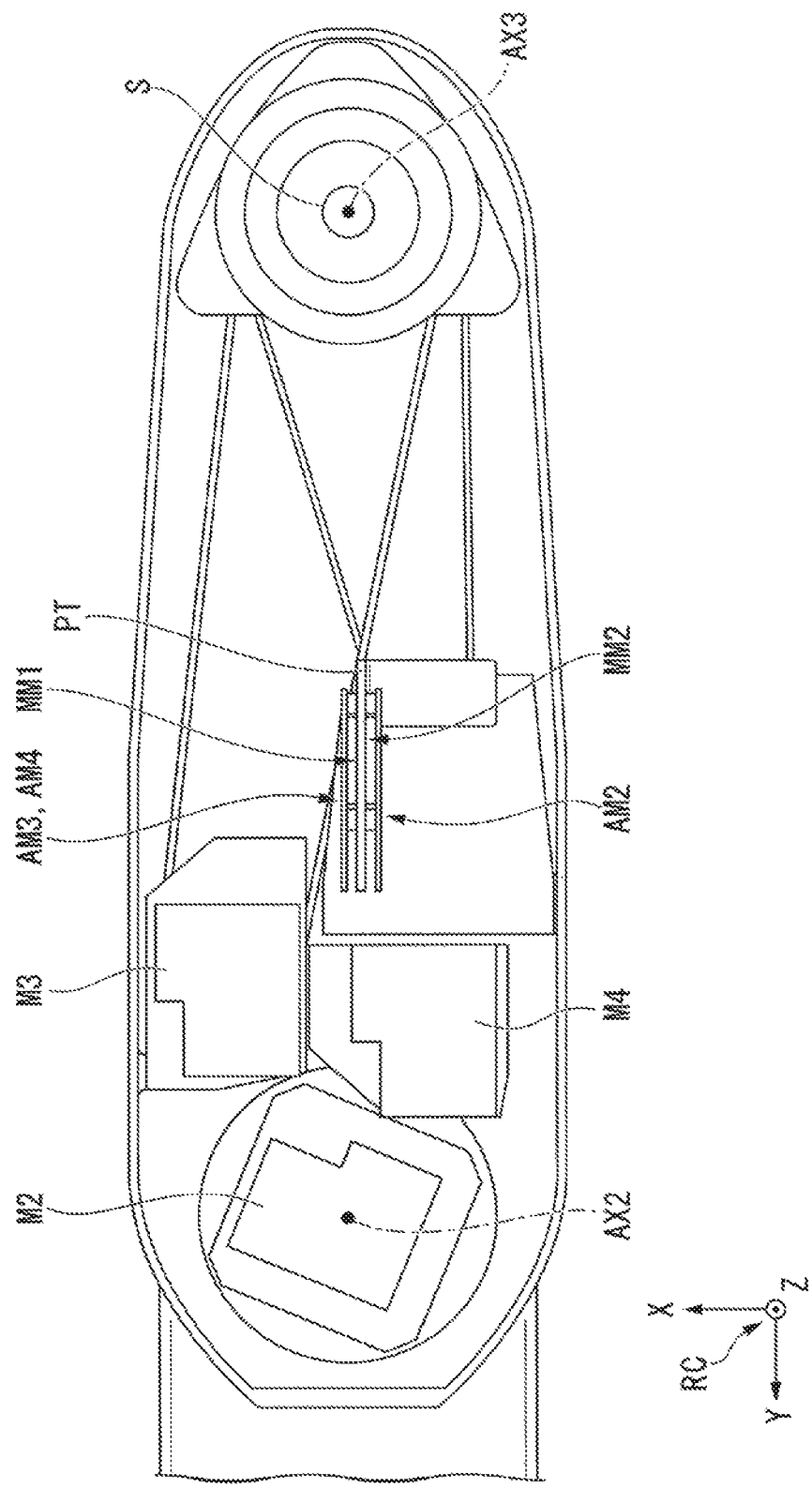

ROBOT

BACKGROUND

1. Technical Field

The present invention relates to a robot.

2. Related Art

Research and development on robots are carried out.

In this regard, a robot in which an amplifier part having a drive circuit that drives a drive part (e.g. servo motor) is provided on a cover is known (see Patent Document 1 (U.S. Pat. No. 7,347,120)).

However, in the robot, when the cover is detached, the detachment of the cover may be difficult due to presence of wires connecting to the amplifier part provided on the cover. As a result, it may be difficult to improve ease of maintenance of the robot.

SUMMARY

An aspect of the invention is directed to a robot including an arm having a cover, a first drive part, a first amplifier part having a first drive circuit that drives the first drive part, and a first member provided in an interior of the arm, wherein the first member is provided with the first amplifier part and separated from the respective first drive part and cover.

With this configuration, in the robot, at least one of a temperature rise of the first amplifier part with heat generation of the first drive part and a vibration of the first amplifier part with a vibration of the first drive part may be suppressed, and the cover may be easily detached.

In another aspect of the invention, the robot may be configured such that the robot includes a region without another member than a wire between the first amplifier part and the cover.

With this configuration, in the robot, the first amplifier part may be easily detached and, as a result, ease of maintenance of the robot may be improved.

In another aspect of the invention, the robot may be configured such that the robot includes a second drive part, and a second amplifier part having a second drive circuit that drives the second drive part, and the first member is provided with the second amplifier part and separated from the second drive part.

With this configuration, in the robot, at least one of the temperature rise of the first amplifier part with the heat generation of the first drive part, a temperature rise of the second amplifier part with heat generation of the second drive part, the vibration of the first amplifier part with the vibration of the first drive part, and a vibration of the second amplifier part with a vibration of the second drive part may be suppressed, and the cover may be easily detached.

In another aspect of the invention, the robot may be configured such that the first drive circuit and the second drive circuit are located on one board.

With this configuration, in the robot, wiring between the first drive circuit and the second drive circuit may be simplified and, as a result, the ease of maintenance of the robot may be improved.

In another aspect of the invention, the robot may be configured such that the first drive part drives a movable member provided on the arm in a translation direction, the second drive part drives the movable member in a rotation direction, and the first member is located between the first drive part and the second drive part as seen from a direction orthogonal to the translation direction and orthogonal to a line connecting the first drive part and the second drive part.

With this configuration, in the robot, the arm may be accurately moved, and at least one of a wire connecting from the first drive part to the first amplifier part and a wire connecting from the second drive part to the second amplifier part may be shortened.

In another aspect of the invention, the robot may be configured such that the first first drive part drives the arm or drives a movable member provided on the arm.

With this configuration, in the robot, at least one of the temperature rise of the first amplifier part with heat generation of the first drive part that drives the arm and the vibration of the first amplifier part with a vibration of the first drive part that drives the arm may be suppressed or at least one of the temperature rise of the first amplifier part with heat generation of the first drive part that drives the movable member provided on the arm and the vibration of the first amplifier part with a vibration of the first drive part that drives the movable member provided on the arm may be suppressed.

BRIEF DESCRIPTION OF THE DRAWINGS

The invention will be described with reference to the accompanying drawings, wherein like numbers reference like elements.

FIG. 4 shows an example of the second arm A2 shown in FIG. 1 when the interior of the second arm A2 is seen from a side in a positive direction of a Z-axis in the robot coordinate system RC.

DESCRIPTION OF EXEMPLARY EMBODIMENTS

Embodiment

As below, an embodiment of the invention will be explained with reference to the drawings.

Configuration of Robot

First, a configuration of a robot 1 will be explained.

Figure 1:
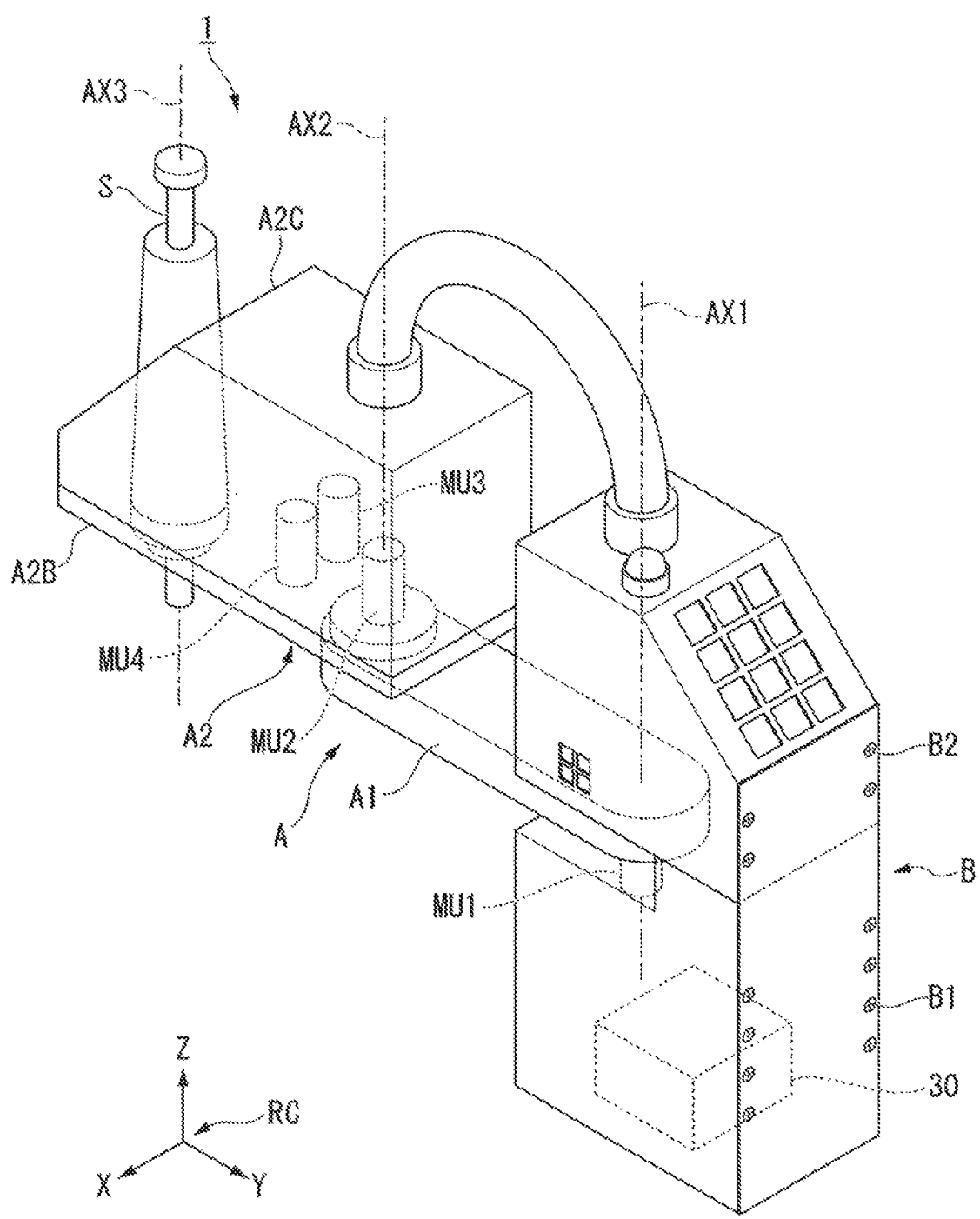
FIG. 1 shows an example of a configuration of a robot 1 according to an embodiment.

FIG. 1 shows an example of the configuration of the robot 1 according to the embodiment. The robot 1 is e.g. a scalar (horizontal articulated) robot. Note that the robot 1 may be another robot such as a vertical articulated robot or Cartesian coordinate robot in place of the scalar robot. The vertical articulated robot may be a single-arm robot having a single arm, a dual-arm robot having two arms (multi-arm robot having two arms), or a multi-arm robot having three or more arms. The Cartesian coordinate robot is e.g. a gantry robot.

The robot 1 includes a base B installed on an installation surface and a movable unit A supported by the base B. The installation surface refers to a surface on which the robot 1 is installed such as a floor surface of a room in which the robot 1 is installed, a wall surface of the room, a ceiling surface of the room, an outdoor ground surface, a top surface of a table, or a top surface of a bench.

The base B is formed by two parts. One of the parts is a first base B1 and the other is a second base B2. Note that the space inside of the first base B1 connects to the space inside of the second base B2.

The first base B1 is installed on the above described installation surface. The first base B1 has a nearly rectangular parallelepiped shape (or cubic shape) as an outer shape, includes plate-like surfaces, and is hollow. The second base B2 is fixed to a first upper surface as one part of the upper surface of the first base B1. The upper surface is a surface on the opposite side to the installation surface of the surfaces of the first base B1. Further, the distance between a second upper surface as the other part than the first upper surface of the upper surface of the first base B1 and the lower surface of the first base B1 is shorter than the distance between the first upper surface and the lower surface. Accordingly, a gap exists between the second upper surface and the second base B2. The movable unit A is provided on the second upper surface. That is, the first base B1 supports the movable unit A. Note that the shape of the first base B1 may be another shape as long as the second base B2 may be fixed to a part of the upper surface of the first base B1 in place of that shape.

The second base B2 has a shape as an outer shape formed by cutting off to remove triangular portions containing single vertexes in two surfaces forming a rectangular parallelepiped shape (or cubic shape) and opposed to each other in a perpendicular direction to the two surfaces. Here, the shape without the cutoff portions is not necessarily formed by cutting off of the portions, but may be formed by forming the same shape directly, for example. The second base B2 has a polyhedral shape as the outer shape, includes plate-like surfaces, and is hollow. Note that the shape of the second base B2 may be another shape as long as the second base B2 may be fixed to a part of the upper surface of the first base B1 in place of that shape.

The movable unit A includes a first arm A1 rotatably supported by the base B (more specifically, the first base B1) about a first rotation axis AX1, a second arm A2 rotatably supported by the first arm A1 about a second rotation axis AX2, and a shaft S rotatably supported about a third rotation axis AX3 and translationally supported in the axis direction of the third rotation axis AX3 by the second arm A2.

The shaft S is an axial member having a cylindrical shape. A ball screw groove and a spline groove (not shown) are respectively formed in the circumferential surface of the shaft S. In the example, the shaft S is provided to penetrate an opposite end portion to the first arm A1 of the end portions of the second arm A2 in a first direction as a direction perpendicular to the installation surface when the base B is installed on the installation surface. The first direction is e.g. a direction along a Z-axis in a robot coordinate system RC shown in FIG. 1. Note that the first direction may be a direction not along the Z-axis in place of the direction along the Z-axis. An end effector can be attached to the end portion on the installation surface side of the end portions of the shaft S. The end effector may be an end effector that can hold an object with finger portions, an end effector that can hold an object by suction by air or magnetic force, or another end effector. In the embodiment, an object is held so that the object can be lifted up. The shaft S is an example of a movable member.

In the example, the first arm A1 rotates about the first rotation axis AX1 and moves in a second direction. The second direction is a direction orthogonal to the above described first direction. The second direction is e.g. a direction along an XY-plane as a plane formed by an X-axis and a Y-axis in the above described robot coordinate system RC. Note that the second direction may be a direction not along the XY-plane in place of the direction along the XY-plane.

Further, the first arm A1 is rotated (driven) about the first rotation axis AX1 by a motor unit MU1 of the base B. The motor unit MU1 includes a drive part M1 (not shown) and an amplifier part AM1 (not shown). Note that the motor unit MU1 may include another member in addition to the drive part M1 and the amplifier part AM1. The drive part M1 is e.g. a servo motor. The drive part M1 may be integrally formed with an encoder that can detect information representing the rotation angle of the drive part M1 or separately formed from the encoder. Note that the drive part M1 may be another member that can rotate the first arm A1 about the first rotation axis AX1 in place of the servo motor. The amplifier part AM1 includes a drive circuit that drives the drive part M1, a control circuit that controls the drive circuit, and a communication circuit. In the example, the amplifier part AM1 may be separately formed from the drive part M1 or integrally formed with the drive part M1. Note that the amplifier part AM1 may include another circuit in addition to the respective drive circuit, control circuit, and communication circuit.

Here, the first arm A1 is rotated (driven) about the first rotation axis AX1 by the drive part M1 of the motor unit MU1. In the example, the first rotation axis AX1 is an axis that coincides with the drive axis of the drive part M1. Note that the first rotation axis AX1 and the drive axis of the drive part M1 do not necessarily coincide. In this case, for example, the drive part M1 rotates the first arm A1 about the first rotation axis AX1 by a method using a pulley and a belt or the like.

The second arm A2 has a cover A2C. More specifically, the second arm A2 has the cover A2C and an arm member A2B. The arm member A2B is a member supported by the first arm A1, to which the cover A2C is attached of the parts of the second arm A2. That is, as shown in FIG. 1, the above described shaft S penetrates the respective cover A2C and arm member A2B in the first direction. Here, the space inside of the second arm A2 refers to a space surrounded by the cover A2C and the arm member A2B when the cover A2C is attached to the arm member A2B. Hereinafter, for convenience of explanation, the space inside of the second arm A2 is referred to as an interior of the second arm A2. Here, the interior of the second arm A2 is an example of an interior of an arm. That is, the second arm A2 is an example of the arm.

In the example, the second arm A2 rotates about the second rotation axis AX2 and moves in the second direction. The second arm A2 is rotated about the second rotation axis AX2 by a motor unit MU2 of the second arm A2. The motor unit MU2 is provided in the interior of the second arm A2. The motor unit MU2 includes a drive part M2 (for example, see FIG. 2) and an amplifier part AM2 (for example, see FIG. 2). Note that the motor unit MU2 may include another member in addition to the drive part M2 and the amplifier part AM2. The drive part M2 is e.g. a servo motor. The drive part M2 may be integrally formed with an encoder that can detect information representing the rotation angle of the drive part M2 or separately formed from the encoder. Note that the drive part M2 may be another member that can rotate the second arm A2 about the second rotation axis AX2 in place of the servo motor. The amplifier part AM2 includes a drive circuit that drives the drive part M2, a control circuit that controls the drive circuit, and a communication circuit. Further, the amplifier part AM2 may be separately formed from the drive part M2. Note that the amplifier part AM2 may include another circuit in addition to the respective drive circuit, control circuit, and communication circuit.

Here, the second arm A2 is rotated (driven) about the second rotation axis AX2 by the drive part M2 of the motor unit MU2. In the example, the second rotation axis AX2 is an axis that coincides with the drive axis of the drive part M2. Note that the second rotation axis AX2 and the drive axis of the drive part M2 do not necessarily coincide. In this case, for example, the drive part M2 rotates the second arm A2 about the second rotation axis AX2 by a method using a pulley and a belt or the like.

The second arm A2 includes a motor unit MU3 and a motor unit MU4 and supports the shaft S. The motor unit MU3 moves the shaft S in the first directions (upward and downward) by turning the ball screw nut provided in the outer circumference part of the ball screw groove of the shaft S with a timing belt or the like. The motor unit MU4 rotates the shaft S about the third rotation axis AX3 by turning the ball spline nut provided in the outer circumference part of the spline groove of the shaft S with a timing belt or the like.

The motor unit MU3 is provided in the interior of the second arm A2. The motor unit MU3 includes a drive part M3 (for example, see FIG. 2) and an amplifier part AM3 (for example, see FIG. 2). Note that the motor unit MU3 may include another member in addition to the drive part M3 and the amplifier part AM3. The drive part M3 is e.g. a servo motor. The drive part M3 may be integrally formed with an encoder that can detect information representing the rotation angle of the drive part M3 or separately formed from the encoder. Note that the drive part M3 may be another member that can move the shaft S in the first directions (upward and downward) by turning the ball screw nut provided in the outer circumferential part of the ball screw groove of the shaft S with a timing belt or the like in place of the servo motor. The amplifier part AM3 includes a drive circuit that drives the drive part M3, a control circuit that controls the drive circuit, and a communication circuit. Further, the amplifier part AM3 may be separately formed from the drive part M3. Note that the amplifier part AM3 may include another circuit in addition to the respective drive circuit, control circuit, and communication circuit.

The motor unit MU4 is provided in the interior of the second arm A2. The motor unit MU4 includes a drive part M4 (for example, see FIG. 2) and an amplifier part AM4 (for example, see FIG. 2). Note that the motor unit MU4 may include another member in addition to the drive part M4 and the amplifier part AM4. The drive part M4 is e.g. a servo motor. The drive part M4 may be integrally formed with an encoder that can detect information representing the rotation angle of the drive part M4 or separately formed from the encoder. Note that the drive part M4 may be another member that can rotate the shaft S about the third rotation axis AX3 by turning the ball spline nut provided in the outer circumference part of the spline groove of the shaft S with a timing belt or the like. The amplifier part AM4 includes a drive circuit that drives the drive part M4, a control circuit that controls the drive circuit, and a communication circuit. Further, the amplifier part AM4 may be separately formed from the drive part M4. Note that the amplifier part AM4 may include another circuit in addition to the respective drive circuit, control circuit, and communication circuit.

As below, as an example, the case where all of the respective drive part M2 to drive part M4 as the three drive parts provided in the interior of the second arm A2 have the same configuration will be explained. Further, as below, as an example, the case where all of the respective amplifier part AM2 to amplifier part AM4 as the three amplifier parts provided in the interior of the second arm A2 have the same configuration will be explained. That is, in the example, the respective motor unit MU2 to motor unit MU4 as the three motor units provided in the interior of the second arm A2 have the same configuration.

The robot 1 is controlled by a robot control apparatus 30. The robot 1 contains the robot control apparatus 30 inside of the base B1. Note that the robot 1 may have a configuration containing the robot control apparatus 30 in another position inside of the robot 1. Or, the robot 1 may be controlled by an external control apparatus 30.

The robot control apparatus 30 is a controller that controls the robot 1. The robot control apparatus 30 drives the respective motor unit MU1 to motor unit MU4 according to an operation program stored in advance, and operates the robot 1.

Placement Forms of Motor Units in Interior of Second Arm

As below, referring to FIGS. 2 to 4, placement forms of the three motor units (the motor unit MU2 to motor unit MU4 in the example) provided in the interior of the second arm A2 will be explained.

Figure 2:
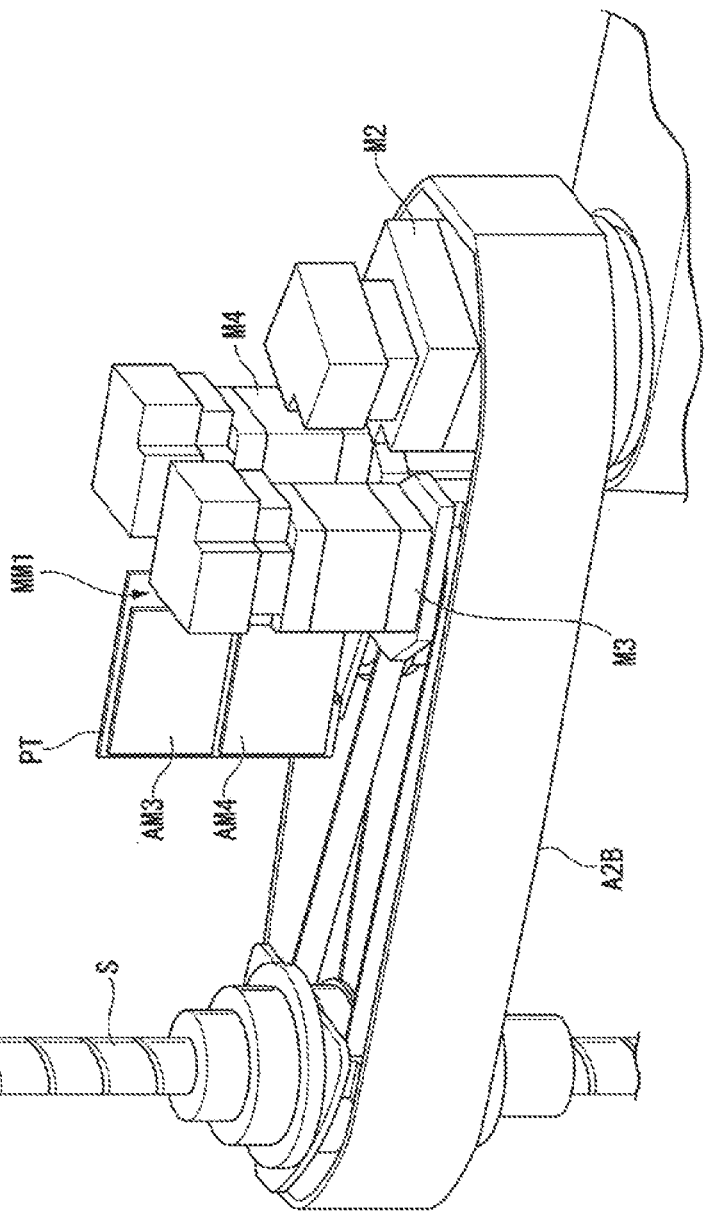
FIG. 2 shows an example of a second arm A2 shown in FIG. 1 when an interior of the second arm A2 is seen from a side in a positive direction of an X-axis in a robot coordinate system RC.

FIG. 2 shows an example of the second arm A2 shown in FIG. 1 when the interior of the second arm A2 is seen from a side in a positive direction of the X-axis in the robot coordinate system RC. FIG. 3 shows an example of the second arm A2 shown in FIG. 1 when the interior of the second arm A2 is seen from a side in a negative direction of the X-axis in the robot coordinate system RC. FIG. 4 shows an example of the second arm A2 shown in FIG. 1 when the interior of the second arm A2 is seen from aside in a positive direction of the Z-axis in the robot coordinate system RC. In the respective FIGS. 2 to 4, the cover A2C is omitted for clearly showing the respective placement forms of the motor unit MU2 to motor unit MU4 in the interior of the second arm A2. Further, in the respective FIGS. 2 to 4, at least part of the members not to be described later of the members provided in the interior of the second arm A2 are omitted for clearly showing the placement forms.

Figure 3:
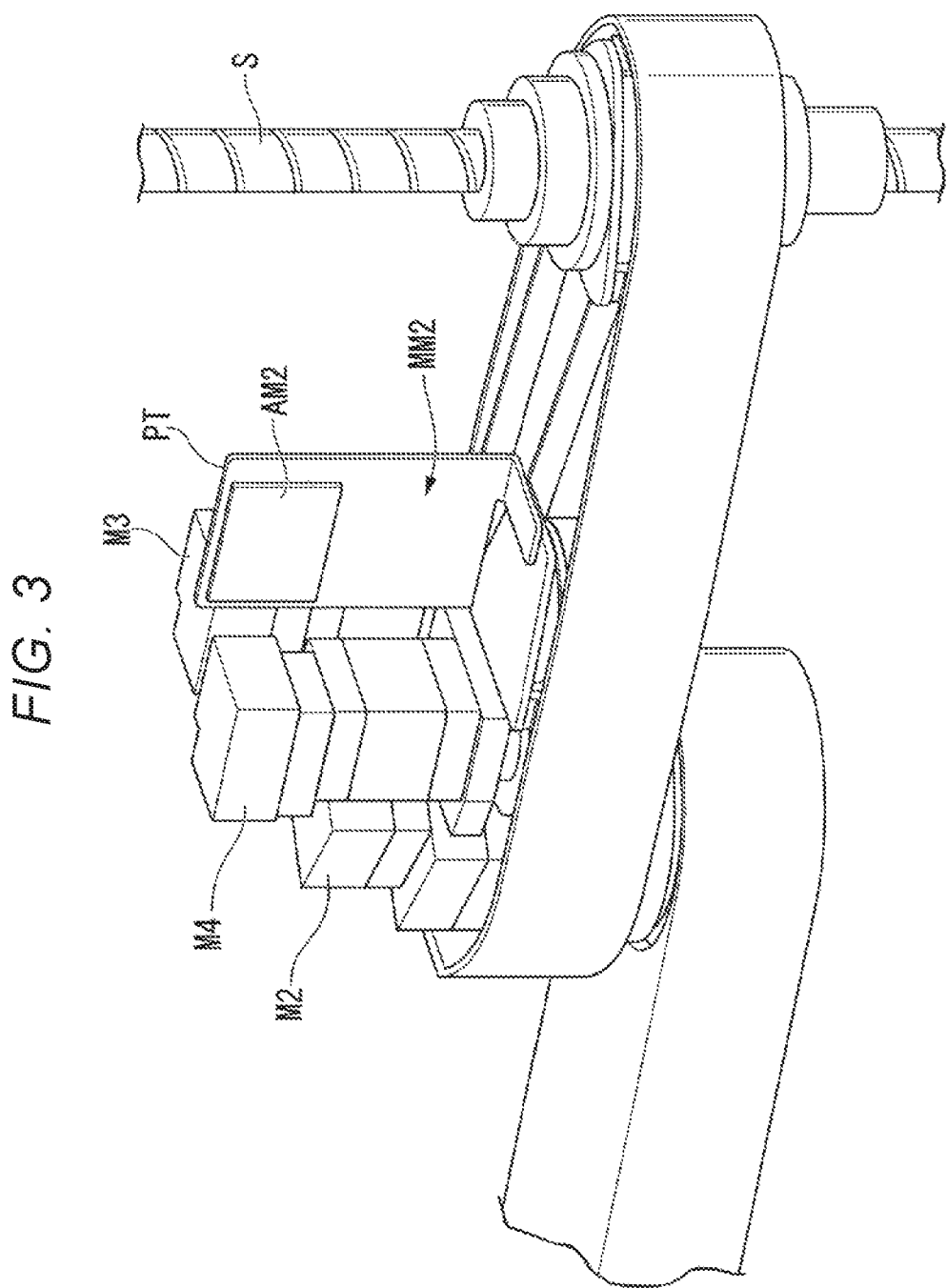
FIG. 3 shows an example of the second arm A2 shown in FIG. 1 when the interior of the second arm A2 is seen from a side in a negative direction of the X-axis in the robot coordinate system RC.

As shown in the respective FIGS. 2 to 4, in the interior of the second arm A2, the drive part M2 and the amplifier part AM2 of the motor unit MU2 are respectively provided in different positions from each other. Further, in the interior, the drive part M3 and the amplifier part AM3 of the motor unit MU3 are respectively provided in different positions from each other. Furthermore, in the interior, the drive part M4 and the amplifier part AM4 of the motor unit MU4 are respectively provided in different positions from each other.

More specifically, in the example shown in the respective FIGS. 2 to 4, the drive part M2 is provided in the position in which the drive axis of the drive part M2 coincides with the second rotation axis AX2 of the positions on the arm member A2B in the interior of the second arm A2. As described above, the drive part M2 is provided on the arm member A2B, and thereby, the drive part M2 does not hinder detachment of the cover A2C from the arm member A2B. Further, in the example, the respective drive part M3 and drive part M4 are provided in positions nearer the third rotation axis AX3 than the position in which the drive part M2 is provided of the positions on the arm member A2B in the interior. Furthermore, in the example, the drive part M3 and the drive part M4 are provided side by side along a fourth direction as a direction orthogonal to both a third direction and the above described first direction in the interior. The third direction refers to a direction along a straight line connecting the second rotation axis AX2 and the third rotation axis AX3. In the example, the drive part M3 and the drive part M4 provided side by side along the fourth direction refers to at least a part of the drive part M3 overlapping with at least a part of the drive part M4 when the drive part M3 and the drive part M4 are seen along the fourth direction (the direction along the X-axis in the robot coordinate system RC in the example shown in FIG. 4). As described above, the drive part M3 and the drive part M4 are provided on the arm member A2B, and thereby, the respective drive part M3 and drive part M4 do not hinder the detachment of the cover A2C from the arm member A2B. Note that the drive part M3 and the drive part M4 may be provided in the interior not to be side by side along the fourth direction.

In the example shown in the respective FIGS. 2 to 4, the respective amplifier part AM2 to amplifier part AM4 are provided on a first member PT provided in the interior of the second arm A2.

The first member PT is a member provided on the arm member A2B in the interior of the second arm A2. The first member PT is separated from the respective drive part M3, drive part M4, and cover A2C when the cover A2C is attached to the arm member A2B. That is, in this case, the first member PT is provided on the arm member A2B not to come into contact with the respective drive part M3, drive part M4, and cover A2C. In the case, the shape of the first member PT may be any shape as long as the first member PT may not come into contact with the respective drive part M3, drive part M4, and cover A2C. In the example shown in the respective FIGS. 2 to 4, the first member PT is a flat plate-like member (for example, a plate). Further, in the example, the first member PT is provided in the interior so that respective two surfaces of the first member PT may be parallel to both the third direction and the above described first direction. Furthermore, in the example, the first member PT is provided in the position nearer the third rotation axis AX3 than the positions in which the respective drive part M3 and drive part M4 are provided of the positions on the arm member A2B in the interior not to overlap with the respective drive part M3 and drive part M4 when the first member PT is seen along the fourth direction. Moreover, the first member PT is provided in the interior to be located between the drive part M3 and the drive part M4 when the second arm A2 is seen in the direction from the third rotation axis AX3 toward the second rotation axis AX2 (the positive direction of the Y-axis in the robot coordinate system RC in the example shown in FIG. 4). In other words, the first member PT is provided in the interior to be located between the drive part M3 and the drive part M4 when the second arm A2 is seen from a direction orthogonal to the first direction as the translation direction of the shaft S and orthogonal to a straight line connecting the drive part M3 and the drive part M4. The straight line connecting the drive part M3 and the drive part M4 refers to e.g. a straight line passing through both a part of the drive part M3 and a part of the drive part M4 of straight lines orthogonal to the first direction. Hereinafter, for convenience of explanation, the surface on the drive part M3 side of the two surfaces of the first member PT in the case is referred to as "first surface MM1" and the surface on the drive part M4 side of the two surfaces in the case is referred to as "second surface MM2".

As described above, the respective amplifier part AM2 to amplifier part AM4 are provided on the first member PT. In this regard, the respective amplifier part AM2 to amplifier part AM4 are provided on the first member PT not to come into contact with the drive part M3, drive part M4, and cover A2C when the cover A2C is attached to the arm member A2B. The first member PT is provided on the arm member A2B, and thereby, the respective amplifier part AM2 to amplifier part AM4 provided on the first member PT do not hinder the detachment of the cover A2C from the arm member A2B. That is, in the robot 1, the cover A2C may be easily detached because there is no member undetachably fixed to both the arm member A2B and the cover A2C in the interior of the second arm A2. As a result, ease of maintenance of the robot 1 may be improved.

As described above, the amplifier part AM2 is not in contact with the drive part M2, and thereby, in the robot 1, at least one of a temperature rise of the amplifier part AM2 with heat generation of the drive part M2 and a vibration of the amplifier part AM2 with a vibration of the drive part M2 may be suppressed. Further, the amplifier part AM3 is not in contact with the drive part M3, and thereby, in the robot 1, at least one of a temperature rise of the amplifier part AM3 with heat generation of the drive part M3 and a vibration of the amplifier part AM3 with a vibration of the drive part M3 may be suppressed. Furthermore, the amplifier part AM4 is not in contact with the drive part M4, and thereby, in the robot 1, at least one of a temperature rise of the amplifier part AM4 with heat generation of the drive part M4 and a vibration of the amplifier part AM4 with a vibration of the drive part M4 may be suppressed.

Here, part or all of the drive circuits of the respective amplifier part AM2 to amplifier part AM4 may be located on one board or located on a plurality of boards. In the case where all of the drive circuits of the respective amplifier part AM2 to amplifier part AM4 are located on one board, in the robot 1, wiring between the respective drive circuits may be simplified and, as a result, the ease of maintenance of the robot 1 may be improved.

In the example shown in the respective FIGS. 2 to 4, the amplifier part AM3 and the amplifier part AM4 are provided on the above described first surface MM1, and the amplifier part AM2 is provided on the second surface MM2. In the example, the drive circuit of the amplifier part AM3 and the drive circuit of the amplifier part AM4 are located on one board. Thereby, in the example, in the robot 1, wiring between the drive circuit of the amplifier part AM3 and the drive circuit of the amplifier part AM4 may be simplified and, as a result, the ease of maintenance of the robot 1 may be improved.

Further, as described above, when the interior of the second arm A2 is seen along the third direction, the first member PT on which the respective amplifier part AM2 to amplifier part AM4 are provided is located between the drive part M3 and the drive part M4, and thereby, in the robot 1, deviation of the moment of inertia of the second arm A2 may be suppressed and the second arm A2 may be accurately moved, and at least one of the wire connecting from the drive part M2 to the amplifier part AM2, the wire connecting from the drive part M3 to the amplifier part AM3, and the wire connecting from the drive part M4 to the amplifier part AM4 may be shortened. As a result, in the robot 1, when the cover A2C is attached to the arm member A2B, the wires caught between the arm member A2B and the cover A2C may be suppressed.

Further, another member is provided so that there may be a region in which the other member except the wires is not located between the respective amplifier part AM2 to amplifier part AM4 and the cover A2C when the cover A2C is attached to the arm member A2B. That is, in the interior of the second arm A2, there is a region without the other member than the wires between the respective amplifier part AM2 to amplifier part AM4 and the cover A2C when the cover A2C is attached to the arm member A2B. Thereby, in the robot 1, when the cover A2C is detached from the arm member A2B, detachment of the respective amplifier part AM2 to amplifier part AM4 from the first member PT is not hindered by the other member. That is, in the robot 1, the respective amplifier part AM2 to amplifier part AM4 may be easily detached and, as a result, the ease of maintenance of the robot 1 may be improved.

As described above, in the robot 1, the respective drive part M2 to drive part M4 and the respective amplifier part AM2 to amplifier part AM4 provided in the interior of the second arm A2 are separately formed, and thereby, the degrees of freedom of the placement forms of the drive part M2 to drive part M4 and the respective amplifier part AM2 to amplifier part AM4 are higher. As a result, in the robot 1, for example, the second arm A2 may be downsized.

Note that the respective drive part M2, drive part M3, drive part M4 described as above are examples of a first drive part. When the drive part M2 is the example of the first drive part, the respective drive part M3 and drive part M4 are examples of a second drive part. Further, the drive part M2 is also an example of a first drive part that drives the arm. When the drive part M2 is the example of the first drive part, the respective drive part M3 and drive part M4 are also the examples of the second drive part. When the drive part M3 is the example of the first drive part, the respective drive part M2 and drive part M4 are the examples of the second drive part. Further, the drive part M3 is also an example of a first drive part that drives a movable member provided on the arm in a translation direction. When the drive part M3 is the example of the first drive part, the drive part M4 is an example of a second drive part that drives the movable member in a rotation direction. When the drive part M4 is the example of the first drive part, the respective drive part M2 and drive part M3 are the examples of the second drive part.

Part or all of the three drive parts provided in the interior of the second arm A2, which are explained as above, may have different configurations from one another. Or, part or all of the three amplifier parts may have different configurations from one another. That is, part or all of the three motor units may have different configurations from one another. Or, in the interior of the second arm A2, in place of the configuration with the three motor units, one motor unit (e.g. any one of the motor unit MU2 to motor unit MU4) may be provided, two motor units (e.g. any two of the motor unit MU2 to motor unit MU4) may be provided, or four or more motor units (e.g. four or more motor units of the motor unit MU2 to motor unit MU4 and another (other) motor unit(s)) may be provided.

When the above described drive part M2 is the example of the first drive part, the amplifier part AM2 is an example of a first amplifier part. In the case, the drive circuit of the amplifier part AM2 is an example of a first drive circuit. Or, when the above described drive part M2 is the example of the second drive part, the amplifier part AM2 is an example of a second amplifier part. In the case, the drive circuit of the amplifier part AM2 is an example of a second drive circuit. Or, when the above described drive part M3 is the example of the first drive part, the amplifier part AM3 is an example of the first amplifier part. In the case, the drive circuit of the amplifier part AM3 is an example of the first drive circuit. Or, when the drive part M3 is the example of the second drive part, the amplifier part AM3 is an example of the second amplifier part. In the case, the drive circuit of the amplifier part AM3 is an example of the second drive circuit.

Or, when the drive part M4 is the example of the first drive part, the amplifier part AM4 is an example of the first amplifier part. In the case, the drive circuit of the amplifier part AM4 is an example of the first drive circuit. Or, when the drive part M4 is the example of the second drive part, the amplifier part AM4 is an example of the second amplifier part. In the case, the drive circuit of the amplifier part AM4 is an example of the second drive circuit.

The shape of the above described first member PT may be another shape in place of the flat plate-like shape. Or, the above described first member PT may be provided in the interior of the second arm A2 so that the respective first surface MM1 and second surface MM2 may be non-parallel to at least one of the above described third direction and first direction. Or, the first member PT may be provided in a position nearer the third rotation axis AX3 than the positions in which the respective drive part M3 and the drive part M4 are provided of the positions on the arm member A2B in the interior of the second arm A2 to overlap with part or all of at least one of the drive part M3 and the drive part M4 when the first member PT is seen along the fourth direction.

All of the members provided on the above described arm member A2B may be provided on the cover A2C. Even in this case, in the robot 1, at least either of temperature rises of the respective amplifier part AM2 to amplifier part AM4 with heat generation of the respective drive part M2 to drive part M4 or vibrations of the respective amplifier part AM2 to amplifier part AM4 with vibrations of the respective drive part M2 to drive part M4 may be suppressed, and the cover A2C may be easily detached.

As described above, the robot 1 includes an arm (the second arm A2 in the example) having a cover (the cover A2C in the example), a first drive part (any one of the drive part M2 to drive part M4), and a first amplifier part (for example, when the example of the first drive part is the drive part M2, the amplifier part AM2) having a first drive circuit that drives the first drive part (for example, when the example of the first drive part is the drive part M2, the drive circuit of the amplifier part AM2), and a first member provided in an interior of the arm (the first member PT in the example), and the first member is provided with the first amplifier part and separated from the respective first drive part and cover. Thereby, in the robot 1, at least one of a temperature rise of the first amplifier part with heat generation of the first drive part and a vibration of the first amplifier part with a vibration of the first drive part may be suppressed, and the cover may be easily detached.

The robot 1 has a region without another member than a wire between the first amplifier part and the cover. Thereby, in the robot 1, the first amplifier part may be easily detached and, as a result, ease of maintenance of the robot may be improved.

The robot 1 includes a second drive part (for example, when the drive part M1 is the example of the first drive part, one of the drive part M3 and the drive part M4), and a second amplifier part (for example, when the drive part M3 is the example of the second drive part, the amplifier part AM3) having a second drive circuit that drives the second drive part (for example, when the drive part M3 is the example of the second drive part, the drive circuit of the amplifier part AM3), and the first member is provided with the second amplifier part and separated from the second drive part. Thereby, in the robot 1, at least one of the temperature rise of the first amplifier part with the heat generation of the first drive part, a temperature rise of the second amplifier part with heat generation of the second drive part, the vibration of the first amplifier part with the vibration of the first drive part, and a vibration of the second amplifier part with a vibration of the second drive part may be suppressed, and the cover may be easily detached.

In the robot 1, the first drive circuit and the second drive circuit are located on one board. Thereby, in the robot 1, wiring between the first drive circuit and the second drive circuit may be simplified and, as a result, the ease of maintenance of the robot 1 may be improved.

In the robot 1, the first drive part (the drive part M3 in the example) drives a movable member (the shaft S in the example) provided on the arm in a translation direction (the first direction in the example), the second drive part (the drive part M4 in the example) drives the movable member in a rotation direction, and the first member is located between the first drive part and the second drive part as seen from a direction orthogonal to the translation direction and orthogonal to a line connecting the first drive part and the second drive part (the fourth direction in the example). Thereby, in the robot 1, the arm may be accurately moved, and at least one of a wire connecting from the first drive part to the first amplifier part and a wire connecting from the second drive part to the second amplifier part may be shortened.

In the robot 1, the first drive part drives the arm (i.e., the drive part M2 in the example) or drives the movable member provided on the arm (i.e., one of the drive part M3 and the drive part M4 in the example). Thereby, in the robot 1, at least one of a temperature rise of the first amplifier part with heat generation of the first drive part that drives the arm and a vibration of the first amplifier part with a vibration of the first drive part that drives the arm may be suppressed or at least one of a temperature rise of the first amplifier part with heat generation of the first drive part that drives the movable member provided on the arm and a vibration of the first amplifier part with a vibration of the first drive part that drives the movable member provided on the arm may be suppressed.

As above, the embodiments of the invention are described in detail with reference to the drawings, however, the specific configurations are not limited to the embodiments and changes, replacements, deletions, etc. may be made without departing from the scope of the invention.

The entire disclosure of Japanese Patent Application No. 2017-221563, filed Nov. 17, 2017 is expressly incorporated by reference herein.

What is claimed is:
1. A robot comprising:
an arm having a cover;
a first motor configured to move a shaft along an axial direction;
a second motor configured to rotate the shaft around the axial direction;
a first amplifier having a first drive circuit that is configured to drive the first motor;
a second amplifier having a second drive circuit that is configured to drive the second motor; and
a plate provided in an interior of the arm, the first and second amplifiers being disposed on the plate,
wherein the plate is spaced apart from the first motor, the second motor, and the cover, and
the plate is located between the first motor and the second motor when viewed in a direction orthogonal to the axial direction and orthogonal to a line connecting the first motor and the second motor.

* * * * *